United States Patent [19]

Kaminski

[11] 4,445,380

[45] May 1, 1984

[54] SELECTABLE FOCUS SPHERICONE TRANSDUCER AND IMAGING APPARATUS

[75] Inventor: Perry Kaminski, Lewistown, Pa.

[73] Assignee: Technicare Corporation, Solon, Ohio

[21] Appl. No.: 400,551

[22] Filed: Jul. 21, 1982

[51] Int. Cl.³ .................... G01N 29/00; G10K 11/00

[52] U.S. Cl. .................................. 73/642; 181/176; 310/335; 367/150

[58] Field of Search ...................... 367/150; 73/642; 181/176; 310/335

[56] References Cited

U.S. PATENT DOCUMENTS

| | | | |
|---|---|---|---|
| 3,754,208 | 8/1973 | Eilers | 367/150 |
| 3,968,680 | 7/1976 | Vopilkin et al. | 73/642 |
| 3,974,475 | 8/1976 | Burkhardt et al. | 367/191 |
| 4,016,751 | 4/1977 | Kossoff | 73/642 |
| 4,097,835 | 7/1978 | Green | 367/150 |
| 4,138,895 | 2/1979 | Mezrich | 73/642 |

FOREIGN PATENT DOCUMENTS

| | | | |
|---|---|---|---|
| 197708 | 3/1976 | U.S.S.R. | 367/150 |

*Primary Examiner*—Howard A. Birmiel

*Attorney, Agent, or Firm*—W. Brinton Yorks, Jr.

[57] ABSTRACT

An ultrasound imaging apparatus and transducer means which produces a converging beam pattern focused along the axis of the transducer with increasing beam concentration towards the furthest point of convergence of the beam pattern.

13 Claims, 6 Drawing Figures

SELECTABLE FOCUS SPHERICONE TRANSDUCER AND IMAGING APPARATUS

BACKGROUND OF THE INVENTION

The prior art comprises many different shapes and sizes or apertures of both transducers for generating and lenses for focusing ultrasonic beams; as well as multiple apertured transducer devices. Spherical ultrasonic lenses focus about a single point. The rapid beam convergence and divergence near the point of focus limit the useful inspection range to a short focal zone. Conical ultrasonic lenses provide focus along a line forming the axis of the cone but side lobes are produced which detract from the quality of an echo image. A lens as disclosed in Toroidal, Conical and Spherical Lenses in Ultrasonic Inspection, Materials Evaluation, 1981 which is a section of a torus also focuses along a line forming the axis of the lens but the toroidal surface extends the depth of field, however, at the expense of increased side lobes. The present invention comprises an ultrasonic transducer means and apparatus with a novel focusing pattern which has advantages in most all ultrasonic imaging applications. The transducer means of the present invention may also have a variable aperture and, hence variable depth of focus. Activation of the variable aperture may be accomplished by a switching means such as a shielded magnetic reed switch as described in copending application Ser. No. 400,547.

Transducers have been produced which have spherical surfaces and variable apertures. Such transducers utilize diffraction limited optics to give variable focal depth by varying the aperture to wavelength ratio. A short focus is achieved by activating an inner circular portion of the spherical transducer and a longer focus may be achieved by activating a larger area of the transducer. However, the transducer has a limited inspection range due to the spherical surface. Also, because the surface is spherical, a relatively small inner aperture must be used to get the shortened focal length desired thereby sacrificing both sharpness of focus and total available energy.

Another multiple apertured transducer is disclosed in an article entitled "The Effects of Multiple Focusing Techniques on Transducer Beam Characteristics" by J. W. Raisch of Sonic Instruments, Inc. The center portion of the transducer disclosed has a smaller radius of curvature than the outer portions and multiple outer portions of increasing radius are proposed. Taken to its extreme the Raisch surface would become hyperbolic in form.

U.S. Pat. No. 4,138,895 to Vilkomerson discloses a dual aperture transducer with a flat surface. The separate inner circular portion of the transducer may be separately activated to produce a narrower beam with greater depth of field.

SUMMARY OF THE INVENTION

The present invention comprises an ultrasound transducer means and imaging apparatus which produce a converging beam pattern focused along the axis of the transducer but with increasing beam concentration towards a furthest point of convergence of the beam pattern. The transducer means compensates for attenuation of sound beams with depth by concentrating the energy necessary for reflection in the deeper region of the field. This transducer configuration produces lower amplitude side lobes than those of toroidal or conical radiators, while retaining the advantages of improved nearfield resolution and depth of focus. The transducer means may comprise separate center and surrounding portions that may be formed of the same or different piezoelectric materials and which may be activated singly or in combination by a switching means. The switching means may comprise a shielded magnetic reed switch to provide a variable aperture and a variable depth of focus. The transducer means may also comprise a toroidal damping ring on the outer back surface of the piezoelectric element.

DESCRIPTION OF THE INVENTION

Figure 1:
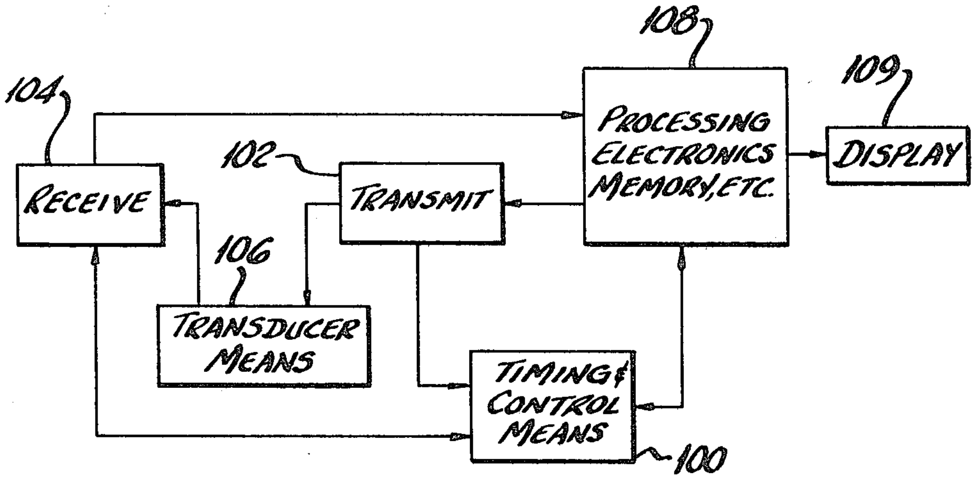
FIG. 1 is a schematic representation of an ultrasound imaging apparatus of the present invention.

There are many varieties of ultrasound imaging apparatus for use with both echo and transmission imaging techniques. The image reliability and quality depends on the transducer and the processing means for producing the image. The present invention commprises a transducer means for producing a unique pattern of ultrasonic beams which may be used, e.g., to produce an image with enhanced resolution and accuracy. A schematic diagram of an ultrasonic imaging apparatus according to the present invention is depicted in FIG. 1. The timing and control means 100 instructs or operates the transmit and receive functions 102 and 104 respectively of the transducer means 106. The timing and control means also informs the processing electronics memory, etc. 108 of its instructions. The processing electronics then produces a display 109. The transducer means 106 comprises a transducer which produces a beam pattern such as that illustrated in FIG. 2. The pattern produced converges and is focused along the axis of the transducer means with increasing beam concentration toward the furthest point of convergence. When used in conjunction with an ultrasonic echo imaging apparatus as shown schematically in FIG. 1, the beam pattern provided by the transducer means gives an imaging range 20 which yields enhanced signal amplitude and resolution. The transducer means depicted in FIGS. 2, 3, and 4 produce such a pattern and therefore comprise transducer means which may be utilized in the apparatus shown schematically in FIG. 1.

Figure 2:
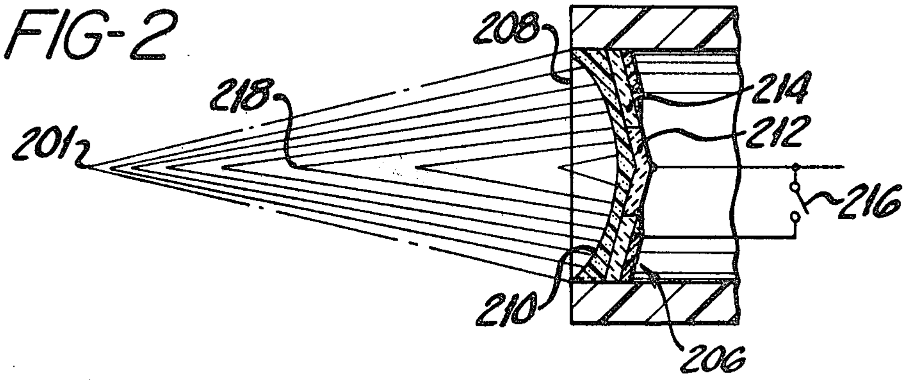
FIG. 2 is a cross-section of one embodiment of a transducer means of the present invention.

As shown in FIG. 2, the transducer means shown generally at 206 comprises a transducer comprising spherical focusing lens 210 and a conical piezoelectric element 208 having a central portion or aperture 212, and at least one surrounding portion 214. The transducer means further comprises a switching means 216 for selectively activating only the central portion of the transducer or activating both the central and selected surrounding portions whereby the imaging range may be lengthened. The switching means may comprise any conventional switching means including a solid state switch or switching diode, but in its preferred embodiment comprises a shielded magnetic reed switch. As shown in FIG. 2, when the entire piezoelectric element is activated, the furthest point of convergence of the beam pattern is at 201. When only the central portion 212 is activated, the furthest point of convergence of the beam pattern is 218. A transducer means such as that depicted in FIG. 2 when used in conjunction with the apparatus suggested by FIG. 1, produces not only improved resolution along a greater depth of focus and therefore better image quality because of the beam pattern used but also provides the ability to quickly and easily change depth of field during the imaging process. In practice, the conical piezoelectric element may be slightly tapered to a greater thickness at the outer portions in order to raise the resonant frequency of the central portion of the transducer. The center and surrounding portions of the piezoelectric element may comprise the same or different piezoelectric materials. The transducer may comprise a single piezoelectric crystal with a groove in the surface separating the central and surrounding portions and of sufficient depth to make the central and surrounding portions separately activatable.

The transducer means of FIG. 2 is also easy to manufacture because it utilizes a well developed mechanical technique to lap or machine the piezoelectric element and the lens.

Figure 3:
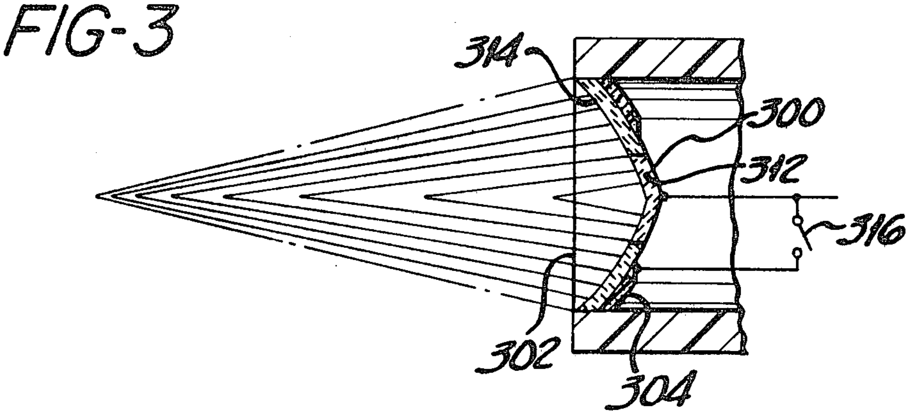
FIG. 3 is a cross-section of another embodiment of a transducer means of the present invention.

The transducer means shown in FIG. 3 comprises a piezoelectric element 300 of a sphericone shape. The sphericone shape is obtained by rotating an arc rather than a line which would produce a conical member. The piezoelectric transducer element again comprises central portion 312 and surrounding portion 314 which may be activated separately or in conjunction by switching means 316. Though only one surrounding portion 314 is shown it is contemplated that multiple surrounding portions could be utilized. The sphericone transducer produces the beam pattern depicted in FIGS. 2 and 3 focused along a line with increasing beam concentration toward the furthest point of convergence of the beam pattern. The transducer means may also be provided with a smooth flat front surface 302 by filling the concavity of the radiating surface with a plastic such as epoxy, polystyrene or polyurethane, having a low sound velocity. This front surface may be provided on any of the transducer means of the present invention and serves to provide a smooth flat front surface. The transducer means of the present invention may also be provided with a damping means such as the toroidal shape 304 depicted in FIG. 3. Though the transducer means without the damping have reduced side lobes as compared to conical or toroidal transducers, the toroidal damping further reduces and substantially eliminates side lobes.

Figure 4:
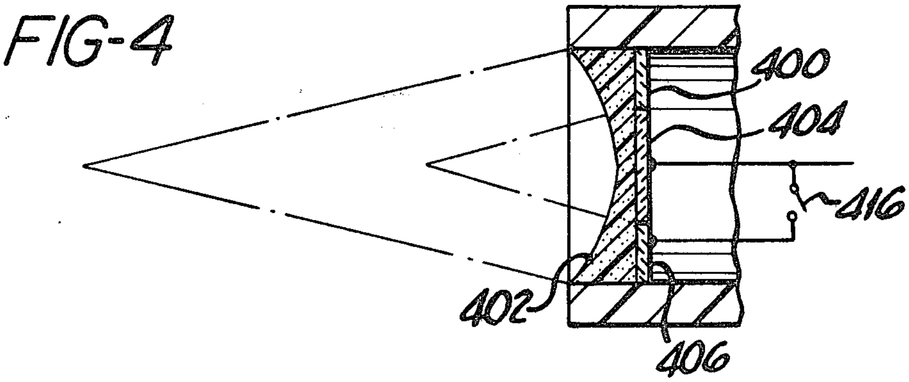
FIG. 4 is a cross-section of another embodiment of a transducer means of the present invention.

The transducer means depicted in FIG. 4 comprises a transducer comprising a flat piezoelectric element 400 and a sphericone front surfaced focusing lens 402. Such a transducer means also produces the beam pattern depicted in FIGS. 2 and 3 and may be provided with a flat front surface by filling in the concavity with plastic as shown in FIG. 3. The piezoelectric element 400 has a uniform thickness and may have a central portion 404 and surrounding portions 406 which may be activated separately or together by switching means 416. The various configurations of transducer means depicted in FIGS. 2, 3, and 4 produce a beam pattern which provides focused sonic energy along a line axial to the transducer and also concentrates that energy near the furthest point of convergence of the beam pattern. This provides not only an imaging range but also provides extra energy at the depth of the range to compensate for increased attenuation of sonic energy with depth of travel. In addition the switching means of the transducer means provides the ability to select the distance or depth of focus. Such a transducer means when used in conjunction with an ultrasonic imaging apparatus provides better resolution and signal amplitude. This provides an apparatus with images that are more accurate and which is easier to use and which may more easily image and accomodate the user of surgical instruments, such as a biopsy or aspiration needle, used in conjunction with the apparatus.

Figure 5:
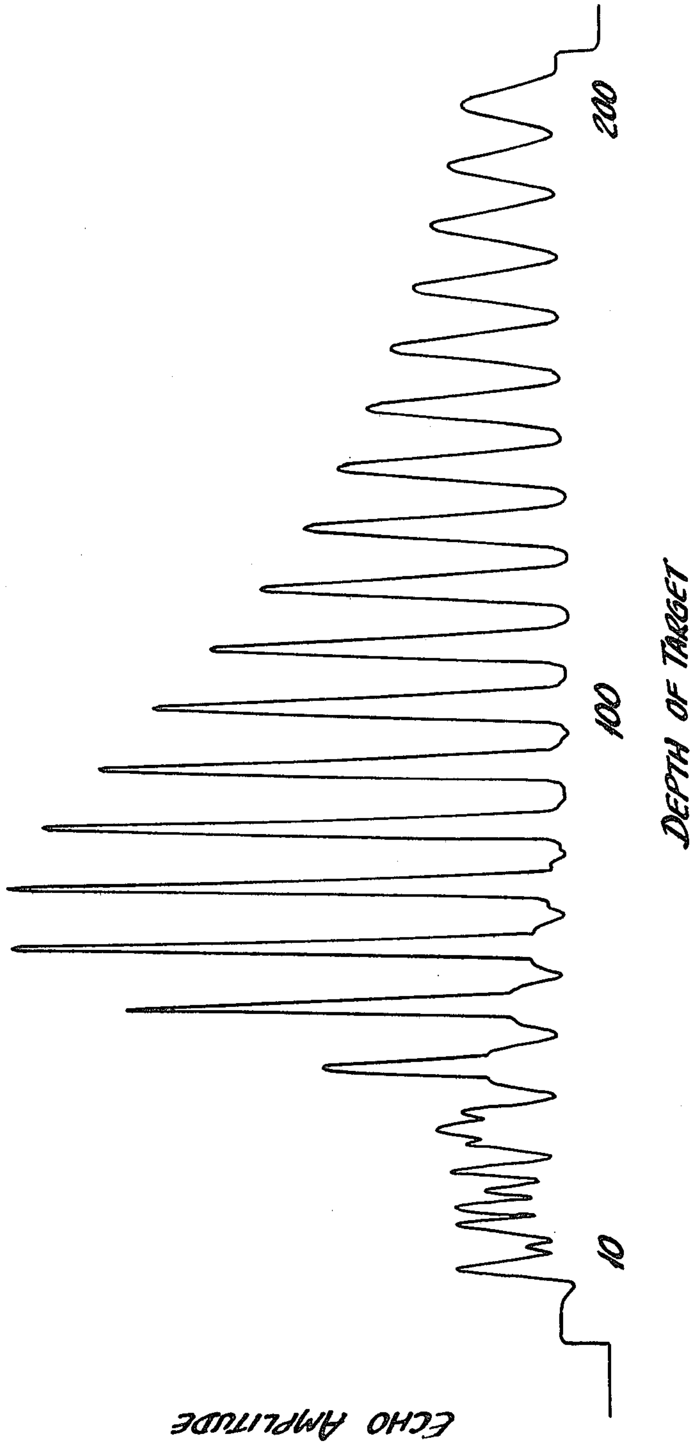
FIGS. 5 and 6 are beam profiles produced with a transducer means of the present invention graphically depicting echo amplitude as a function of beam diameter.
Figure 6:
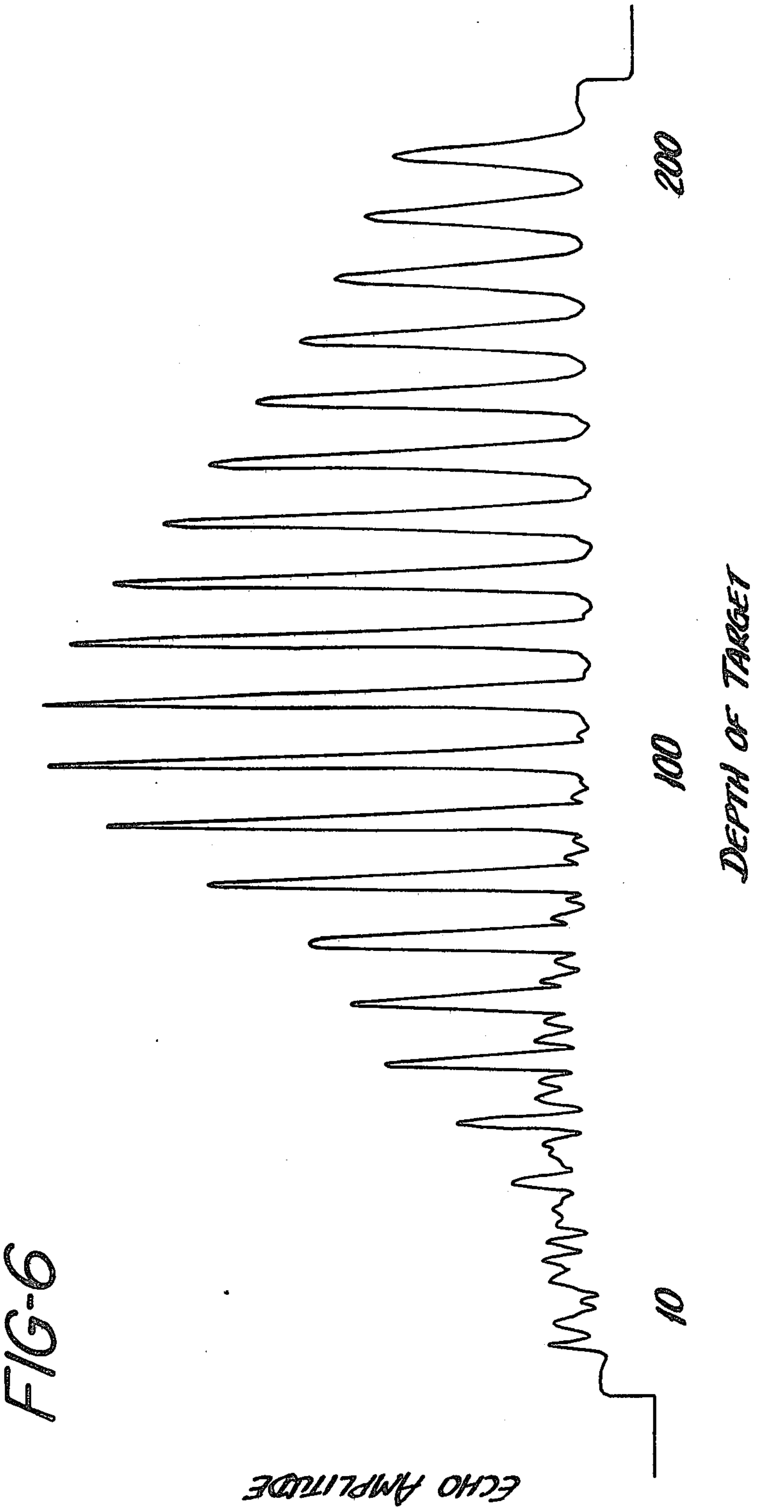

FIGS. 5 and 6 illustrate the beam profiles produced by the various configurations of transducer means described in FIGS. 2, 3, and 4. FIG. 5 shows beam profile produced when the central portion or aperture only is activated. FIG. 6 shows the beam profile produced when the central and surrounding portion of the transducer means are activated. The beam profiles depict the echo amplitude of the transducer as it traverses over a target consisting of a stepwise array of ¼" diameter stainless steel rods with 10 mm depth spacing and 10 mm lateral spacing. The beam profiles clearly disclose the length of the inspection range and the change in depth of sound energy penetration and corresponding echo achieved by activating the central and surrounding portions of the transducer means. The beam profiles also show a reduced level of reflection due to side lobes.

I claim:

1. An ultrasonic transducer for use with an ultrasonic diagnostic system, comprising piezoelectric material exhibiting a radiating surface having a generally circular, concave shape with a center point, said radiating surface in cross-section resembling two symmetrical arcuate surfaces symmetrically disposed on either side of said center point and canted toward each other at an angle which is less than the angle traversed by a spherical surface of the same curvature as said arcuate surfaces and the same diameter as said effective radiating surface.

2. An ultrasonic transducer for use with an ultrasonic diagnostic system, comprising a surface of piezoelectric material and an acoustic lens affixed to said surface, said piezoelectric material and affixed acoustic lens together providing an effective radiating surface having a generally circular, concave shape with a center point, said effective radiating surface in cross-section resembling two symmetrical arcuate surfaces symmetrically disposed on either side of said center point and canted toward each other at an angle which is less than the angle traversed by a spherical surface of the same curvature as said arcuate surfaces and the same diameter as said effective radiating surface.

3. The ultrasonic transducer assembly of claim 2, wherein said piezoelectric material is electrically separated into a central member having an outer perimeter symmetrically disposed with respect to said center point, and an annuar member symmetrically disposed about the perimeter of said central member.

4. The ultrasonic transducer assembly of claim 2, wherein said effective radiating surface is formed by a conical disc of piezoelectric material having a concave face, and an acoustic lens located in front of said concave face and having a spherical face on the surface remote from said concave face.

5. The ultrasonic transducer assembly of claim 4, wherein said acoustic lens comprises an epoxy material bonded to said concave face of said conical disc of piezoelectric material.

6. The ultrasonic transducer assembly of claim 5, wherein said conical disc of piezoelectric material comprises a central conical disc and an outer annulus surrounding said central disc.

7. The ultrasonic transducer assembly of claim 5, further comprising an annulus of backing material affixed to the back of said conical disc of piezoelectric material around the outer perimeter thereof.

8. The ultrasonic transducer assembly of claim 2, wherein said piezoelectric material comprises a flat disc having a front face and including an acoustic lens mounted on said front face and having an aspheric surface remote from said flat disc of the shape of said effective radiating surface.

9. The ultrasonic transducer assembly to claim 8, wherein said flat disc comprises a central disc and a separate annular ring disposed about said central disc.

10. An ultrasonic transducer assembly for use with an ultrasonic diagnostic system, comprising a conical surface of piezoelectric material, and an acoustic lens affixed to said conical surface and having a spherical surface remote from said conical surface.

11. The ultrasonic transducer assembly of claim 10, wherein said acoustic lens comprises epoxy exhibiting a high acoustic impedance and velocity relative to human tissue.

12. The ultrasonic transducer assembly of claim 10, wherein said conical surface of piezoelectric material comprises a central conical surface having an outer perimeter, and an annular surface disposed about said outer perimeter.

13. The ultrasonic transducer assembly of claim 12, wherein said central conical surface exhibits a first geometric focus and near field focus limit, and said central conical surface and annular surface together exhibit a second geometric focus and near field focus limit.

* * * * *